Aug. 11, 1959    R. R. CARLTON ET AL    2,898,708
AUTOMATIC CUTTER GRINDER
Filed Dec. 3, 1956    7 Sheets-Sheet 1

INVENTORS
RAYMOND R. CARLTON
PETER E. MORTENSEN
BY

Buckhorn, Cheatham & Blore
ATTORNEYS

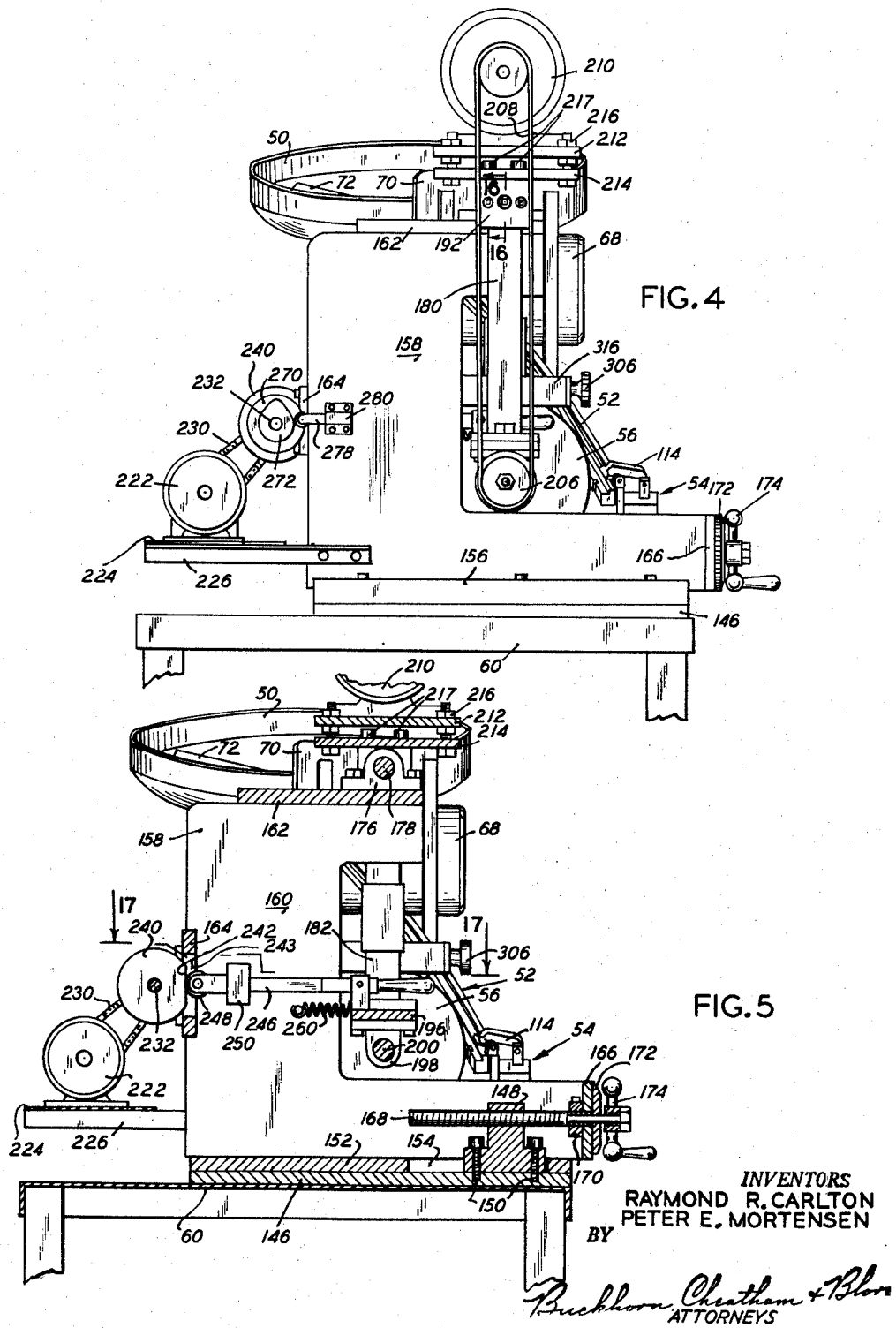

Aug. 11, 1959    R. R. CARLTON ET AL    2,898,708
AUTOMATIC CUTTER GRINDER
Filed Dec. 3, 1956    7 Sheets-Sheet 3
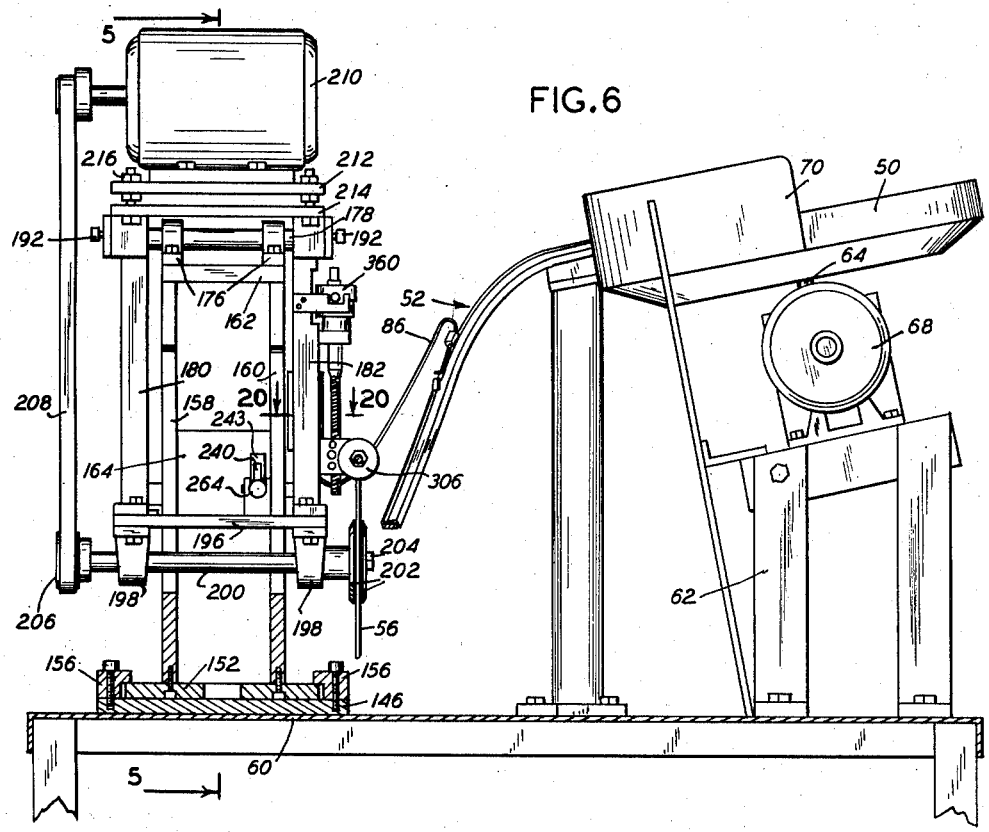
FIG. 6
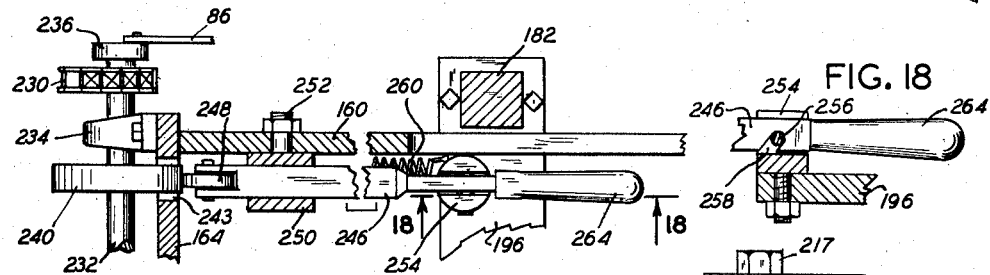
FIG. 17    FIG. 18    FIG. 16
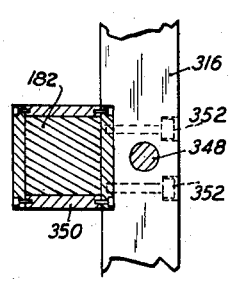
FIG. 20
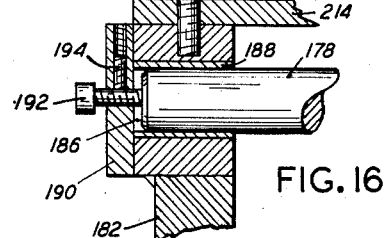
INVENTORS
RAYMOND R. CARLTON
PETER E. MORTENSEN
BY
*Buckhorn, Cheatham & Blore*
ATTORNEYS

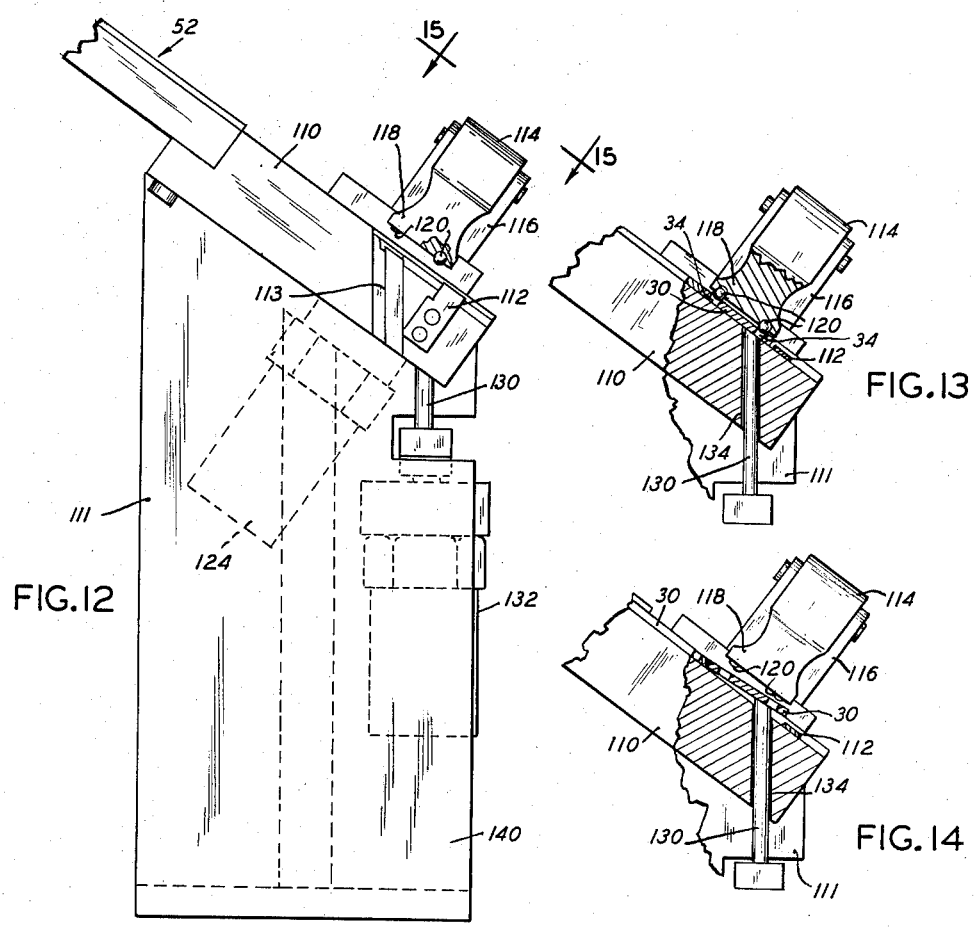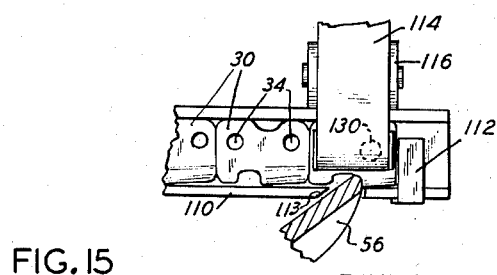

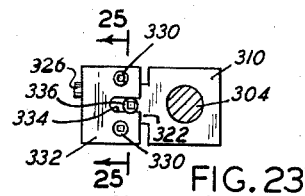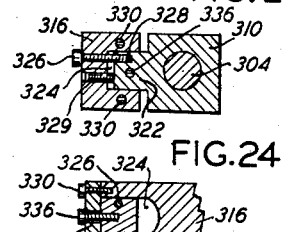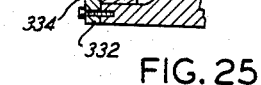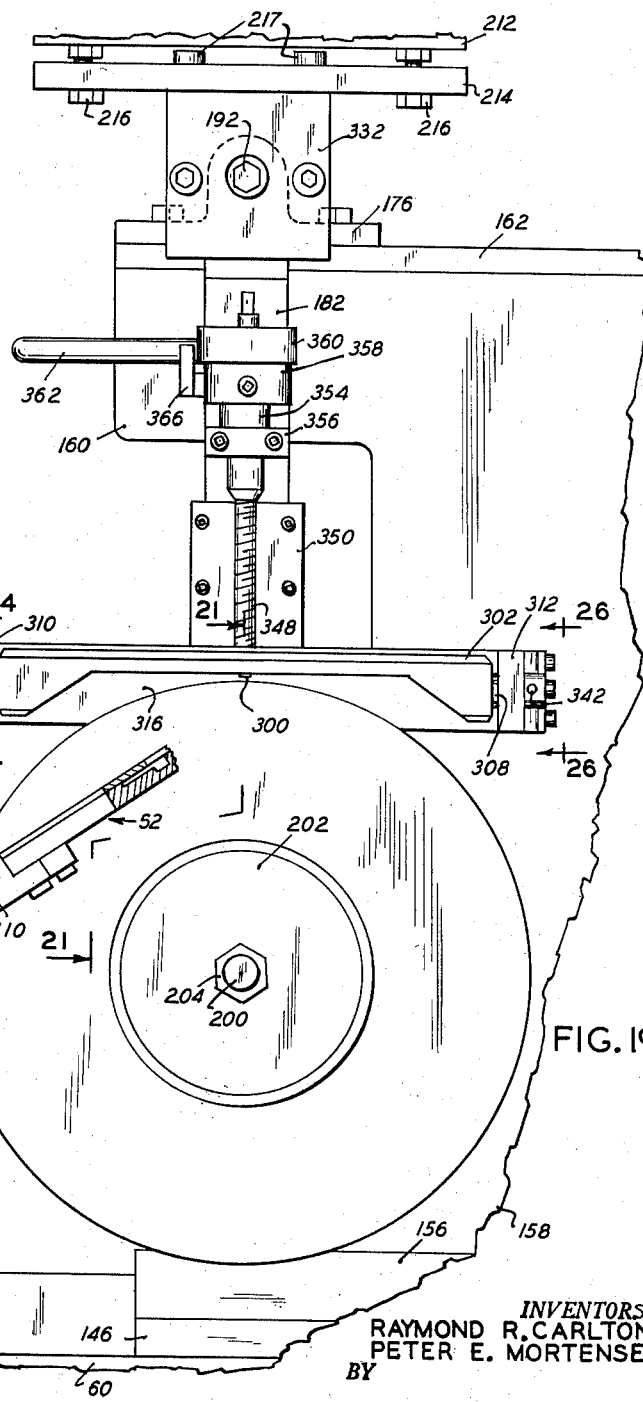

Aug. 11, 1959  R. R. CARLTON ET AL  2,898,708
AUTOMATIC CUTTER GRINDER
Filed Dec. 3, 1956  7 Sheets-Sheet 7
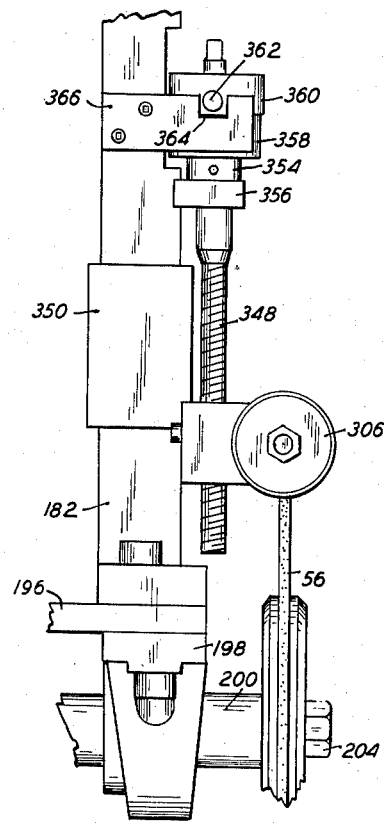
FIG. 29
FIG. 26
FIG. 27
FIG. 28
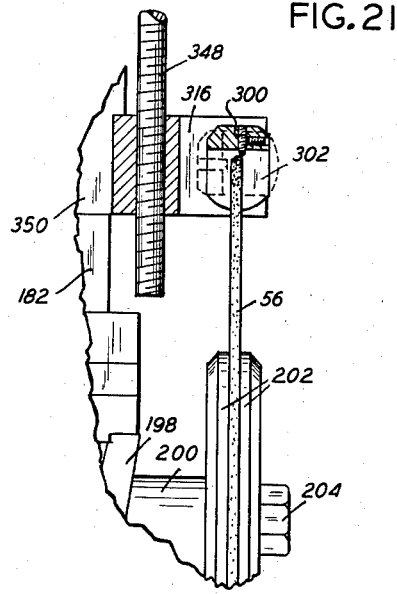
FIG. 21
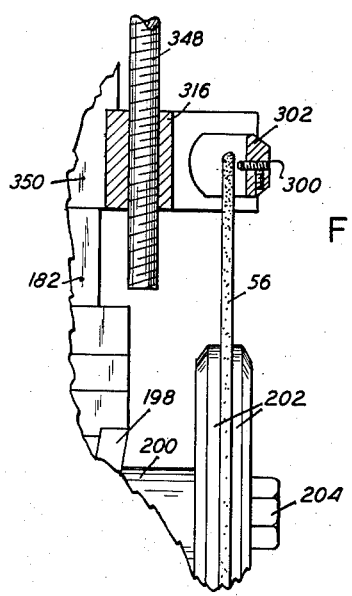
FIG. 22
INVENTORS
RAYMOND R. CARLTON
PETER E. MORTENSEN
BY
Buckhorn, Cheatham & Blore
ATTORNEYS

United States Patent Office 2,898,708
Patented Aug. 11, 1959

2,898,708

AUTOMATIC CUTTER GRINDER

Raymond R. Carlton, Portland, and Peter E. Mortensen, Milwaukie, Oreg., assignors to Omark Industries, Inc., a corporation of Oregon Application December 3, 1956, Serial No. 625,670

14 Claims. (Cl. 51—98)

The present invention relates to apparatus for sharpening the cutters of saw chain teeth, and more particularly to apparatus for sharpening saw chain teeth cutters by grinding the same.

It is a principal object of the invention to provide new and improved apparatus for sharpening cutters of saw chain teeth prior to the assembly of the teeth in a saw chain.

It is another object to provide new and improved apparatus for sharpening saw chain teeth with a circular grinding wheel.

More particularly it is an object to provide a new and improved machine for hollow grinding the cutting edge of a saw chain cutter.

A further object of the invention is to provide new and improved apparatus for sharpening saw chain cutters rapidly and accurately.

Still another object of the invention is to provide a machine for grinding saw chain cutters with means for rapidly and accurately re-setting the grinding wheel in correct position after dressing of the grinding wheel.

Another object is to provide, in a machine of the class described, new and improved means for clamping a tooth in a predetermined position for sharpening thereof.

Other objects and advantages of the invention will become more apparent hereinafter.

In accordance with the illustrated embodiment of the present invention, means are provided for retaining a supply of saw chain teeth and for feeding the teeth one by one from the supply to a grinding station. Means are provided at the grinding station for clamping the teeth in predetermined position whereafter the cutters thereof are engaged on their leading ends by a grinding wheel to form a sharp cutting edge. Means are provided on the machine for re-dressing the grinding wheel, as necessary, and the grinding wheel is so mounted on the machine that after it is dressed it can be re-positioned quickly and accurately whereby the teeth sharpened by the re-dressed wheel will be sharpened accurately and within the desired tolerance limits.

For a more detailed description of the invention, reference is made to the accompanying drawings, wherein:

Fig. 4 is a side elevational view of the machine;

Fig. 5 is a sectional view of the machine taken substantially along line 5—5 of Fig. 6;

Fig. 6 is a sectional view taken substantially along line 6—6 of Fig. 3;

Fig. 12 is an enlarged, fragmentary view of the grinding station;

Fig. 13 is a view of a portion of the mechanism at the grinding station partly broken away to show details of the mechanism for clamping a tooth in position to be ground;

Fig. 14 is a view similar to Fig. 13 showing another sequence in the operation of the clamping mechanism;

Fig. 15 is a fragmentary top view of the clamping mechanism looking in the direction of the arrows 15—15 in Fig. 12;

Fig. 16 is an enlarged, sectional view of a detail of the grinding wheel mounting taken substantially along line 16—16 of Fig. 4;

Fig. 17 is an enlarged, fragmentary, sectional view taken substantially along line 17—17 of Fig. 5;

Fig. 18 is a fragmentary view looking in the direction of the arrows 18—18 of Fig. 17;

Fig. 19 is an enlarged side view showing further details of the grinding wheel mounting arrangement and the grinding station;

Fig. 20 is an enlarged, sectional view taken along line 20—20 of Fig. 6;

Fig. 21 is a slightly enlarged, fragmentary, cross sectional view taken substantially along line 21—21 of Fig. 19, showing certain details of the mechanism for dressing the grinding wheel;

Fig. 22 is a view similar to Fig. 21 showing another operational position of the dressing mechanism;

Fig. 23 is a view looking in the direction of the arrows 23—23 of Fig. 19;

Fig. 24 is a sectional view taken along the line 24—24 of Fig. 19;

Fig. 25 is a sectional view taken along line 25—25 of Fig. 23;

Fig. 26 is a fragmentary view of the apparatus for supporting the dressing mechanism, looking in the direction of the arrows 26—26 of Fig. 19;

Fig. 27 is a further view, looking in the direction of the arrows 27—27 of Fig. 26;

Fig. 28 is a fragmentary, sectional view taken along line 28—28 of Fig. 26; and

Fig. 29 is a fragmentary, front elevational view of the mechanism for dressing a grinding wheel.

Figure 3:
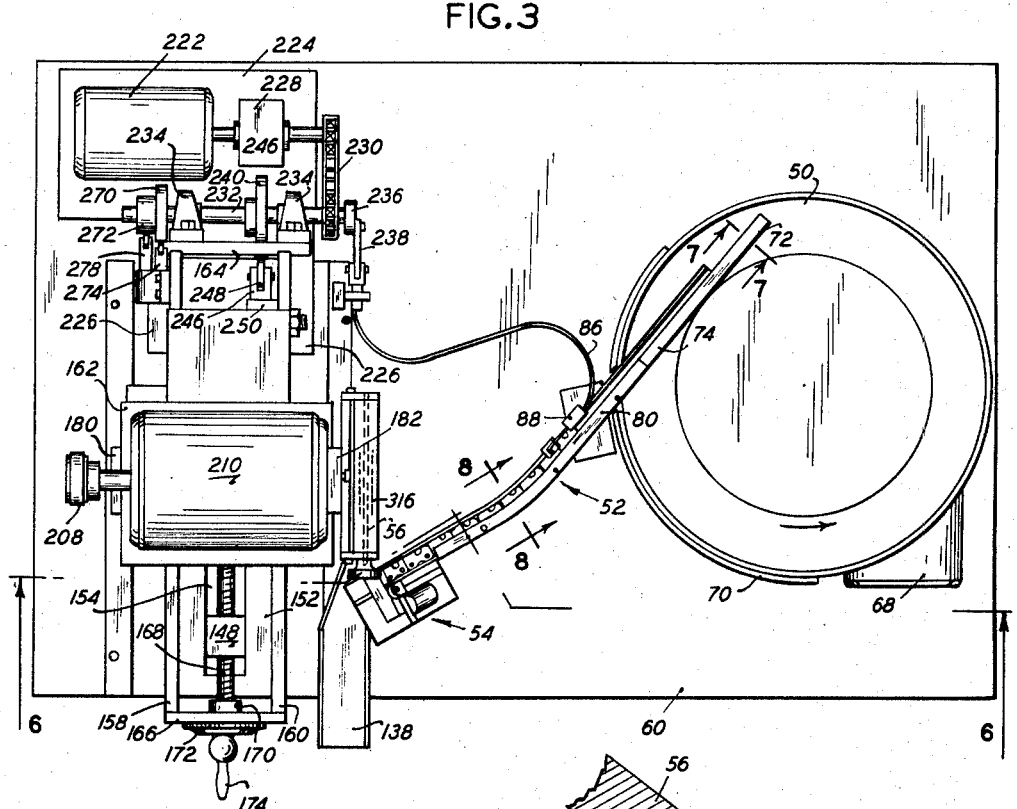
Fig. 3 is a top plan view of a machine constructed in accordance with the invention.
Figures 1, 8:
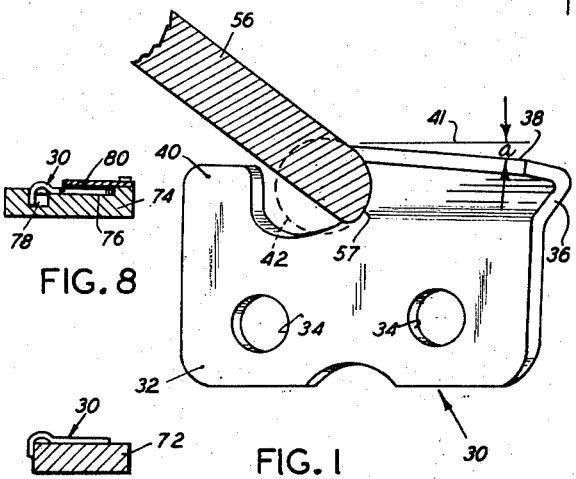
Fig. 1 is a perspective view of a saw chain tooth which may be sharpened in accordance with the machine of the invention showing the cross sectional configuration and position of the grinding wheel in sharpening the same.
Fig. 8 is a sectional view of another portion of the trackway taken substantially along line 8—8 of Fig. 3.
Figures 2, 7:
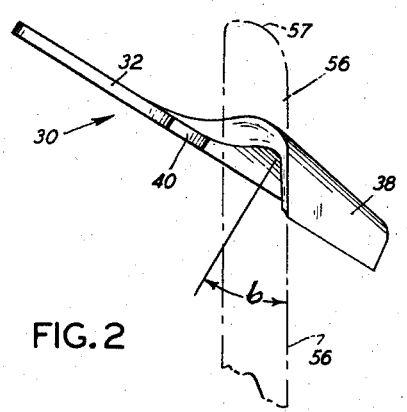
Fig. 2 is a further perspective view of the tooth showing schematically how the grinding wheel engages the tooth to sharpen the same.
Fig. 7 is a sectional view of the trackway along which the teeth to be sharpened are fed, the view being taken substantially along line 7—7 of Fig. 3.

Referring first to Figs. 1 and 2, the machine illustrated in the drawings is particularly constructed and adapted for sharpening saw chain teeth such as indicated generally at 30 and including a flat body portion 32 having a pair of circular openings 34 therein for receiving pivot pins by means of which the teeth are connected in a saw chain. The tooth 30 is formed with a cutter including a reversely curved shank portion 36 extending from the body portion 32 and a flat toe portion 38 which extends tangentially from the shank 36 substantially at right angles to the plane of the body portion 32. To provide clearance, preferably the toe portion 38 slopes downwardly toward the rear of the tooth at a small angle $a$. The front edge of the toe portion 38 slants rearwardly at an angle $b$ of about 35 degrees, as shown in Fig. 2. The tooth 30 may also be provided with a depth gauge 40.

Such a tooth is more fully described in the patent to

Cox, No. 2,508,784. It is to be understood, of course, that saw chains include cutting teeth 30 of alternate right and left configuration. The invention is illustrated in connection with a tooth of right hand configuration but it will be apparent that the invention is, by suitable modification, applicable to teeth of left hand configuration as well.

The cutter of the tooth 30 is adapted to be sharpened when it is assembled in a chain with a cylindrical file, indicated by a dotted circle at 42 in Fig. 1, held at an oblique angle of about 35 degrees with respect to the plane of the body portion 32 with the axis of the file parallel to the top of the toe 38, so that both the shank and toe portions will be formed with a concave or hollow ground surface conforming to the cylindrical surface of the file. The machine of the invention is adapted to hollow grind the cutters of saw chain teeth in the course of their manufacture and before their assembly into a saw chain and to provide the cutters with a contour substantially such as would be formed thereon by sharpening the tooth with a file, as described above. This is accomplished in the machine of the invention with a circular grinding wheel 56 having an arcuate periphery 57 of a radius equal to that of the file with which the tooth is adapted to be sharpened. The cutting edge of the cutter toe and shank portion subtend just slightly more than a quarter of the circumference of a file and the grinding wheel 56 is therefore, as shown in Fig. 1, of a thickness just slightly greater than the radius of the periphery surface.

Referring next more particularly to Figs. 3 to 6, inclusive, the machine in general comprises a pan 50 in which a random supply of saw chain teeth to be sharpened may be placed. The teeth are fed from the pan 50 onto a track 52 in which they are aligned in end to end relation, and on which they travel to a grinding station indicated at 54. As each tooth reaches a grinding station 54, it is clamped thereat momentarily and the grinding wheel 56 is moved into engagement with the leading edge of the cutter of the tooth in such position that the peripheral surface 57 is coincident to the position which would be assumed by the file 42 so as to hollow grind a similar sharpened leading edge thereon. When the tooth has been sharpened, the grinding wheel is retracted and the sharpened tooth ejected from the track so that the next successive tooth may be moved into the grinding station.

More specifically, the machine of the invention comprises a base frame including a table 60 adjacent one end of which the pan 50 is rotatably supported on a stand 62. The pan 50 is mounted on a shaft 64 suitably journaled on the stand 62 and driven by a motor 68. As is shown, the pan 50 is tilted toward the grinding mechanism and a shield 70 is mounted adjacent the lower side of the pan to prevent saw chain teeth 30 from falling over the lip of the pan. The pan 50 is adapted to be filled with a supply of saw chain teeth to be sharpened and to be rotated in the direction of the arrow in Fig. 3, that is, counter-clockwise.

Extending over the lower edge of the pan 50 and towards the upper side thereof is the upper end of the track 52, which is formed at that point merely as a rectangular bar 72, as indicated in Fig. 7, constituting a cutter unit pick up means. Some of the teeth 30 will fall upon the bar 72 with the cutter toe 38 extending downwardly so that it will catch on the upper side of the bar as shown. Succeeding teeth striking a tooth so caught will push it down the track. Teeth that do not catch, as shown in Fig. 7, will fall back into the pan to be swept around until eventually they catch upon the bar 72 and enter the track 52. The bar 72 leads the teeth into a trackway or guide way 74, shown most clearly in Fig. 8. As shown, the guideway 74 is formed with a recess 76 to receive the tooth body 32 and a groove 78 to receive the toe 38. A cover plate 80 is provided over the recess 76 to prevent the teeth from falling out of the guideway as they slide down the same towards the grinding station 54.

Figure 9:
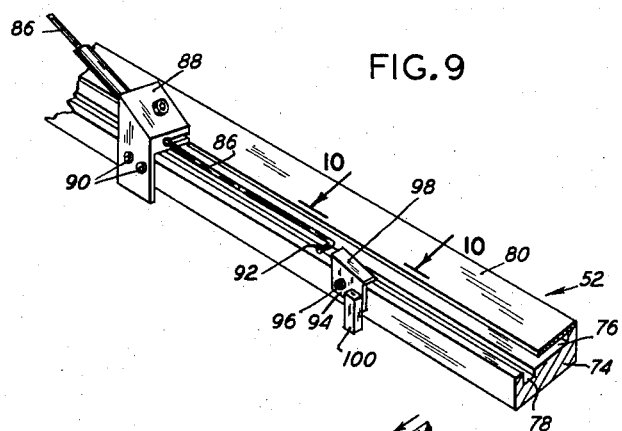
Fig. 9 is an enlarged, fragmentary, perspective view of the trackway showing details of an arrangement for pushing teeth down the trackway.
Figure 10:
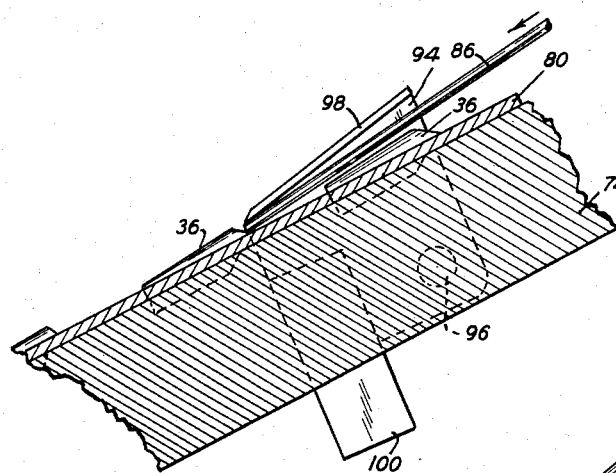
Fig. 10 is a fragmentary, sectional view taken substantially along line 10—10 of Fig. 9.
Figure 11:
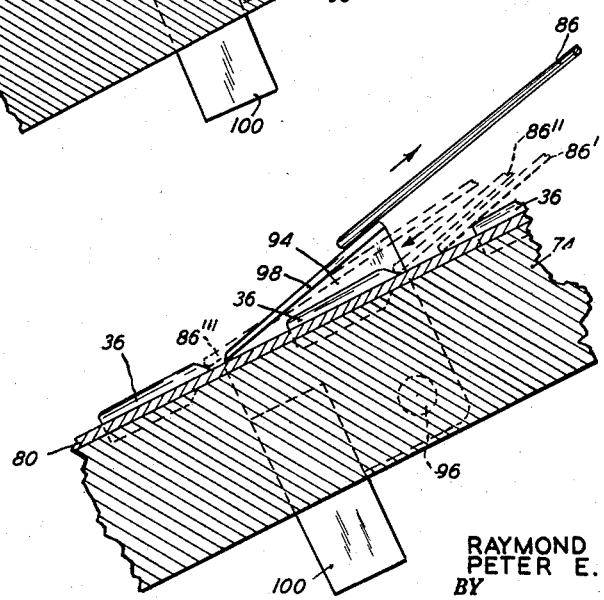
Fig. 11 is a view similar to Fig. 10 but showing a further sequence in the operation of the machine.

While ordinarily the teeth 30 will slide down the guideway to the grinding station solely under the influence of gravity without difficulty, occasionally a tooth may hang up in the lower portion of the guideway. Accordingly, means may be provided to push the teeth therealong and assure that each tooth reaches its proper position at the grinding station. Suitable means for this purpose are illustrated most clearly in Figs. 9, 10 and 11, to which particular reference is now made. One end of a pusher rod 86 comprising in this instance a flexible cable is supported in a guide 88 suitably mounted on the guide way 74, as by screws 90, so that the mentioned end of the pusher rod may be reciprocated longitudinally of the guide way, by means to be hereinafter described, in a stroke slightly greater than the length of the cutter of a tooth 30. The lower end of the rod 86 is formed with a hooked end 92 adapted to engage the forward end of a tooth shank and push the same down the guide way, as indicated in Figs. 10 and 11, the lower limit of the stroke being fixed in relation to a stop at the grinding station and to be later described. Thus, referring to Fig. 11, the position of the pusher rod 86 at the start of its pushing stroke is shown in dotted lines at 86'. As the pusher rod is moved downwardly, the hooked end 92 will engage the shank 36 of a tooth, as indicated at 86", to push the tooth therealong until the rod reaches its lowermost position, as indicated in dotted lines at 86'''. To prevent the rod end 92 from engaging the rear end of the tooth during retraction of the rod, a lifting shoe 94 is provided, the shoe being pivotally mounted on the side of the guide way 74 by a pivot pin 96, and having a flange 98 extending over the top of the guide way. As the rod 86 pushes a tooth downwardly, the rod end 92 slides under the lower end of the shoe, temporarily lifting the shoe as shown in Fig. 10. A counter-weight 100 is provided normally to tilt the lower end of the shoe 94 downwardly and against the top surface of the guide way, as shown in Fig. 11. Thus, as the rod is retracted, the end 92 thereof will be forced up over the top of the shoe and lifted over the tooth 30 lying therebeneath, as shown in Fig. 11. When the rod end 92 reaches the upper end of the shoe 94, it will fall downwardly onto the track and in position to engage a tooth 30 when the rod begins its downward movement.

With particular attention next to Figs. 12 to 15, inclusive, the teeth 30 are pushed from the track 52 on to a grinding station platform 110 supported on a bracket 111 and against a stop 112 provided thereat. The stop 112 is preferably slightly down grade from the desired position of the tooth when it is being ground by the wheel 56, the reason for which will become more apparent hereinafter. Means are provided for clamping and holding the tooth to be sharpened in predetermined location on the platform 110 opposite a notch 113 for entry of the grinding wheel 56. Such means may comprise a clamping member or rocker 114 pivotally mounted in a bracket 116 and having a clamping head 118 in which are embedded two hardened balls or spheres 120 which have a diameter slightly greater than the diameter of the saw chain tooth openings 34. The balls 120 have their centers spaced apart a distance equal to the spacing between the axes of the tooth openings 34 and are adapted to engage in such tooth openings and to locate and hold a tooth in the proper position to be ground by the grinding wheel 56. As has been mentioned previously, the stop 112 is positioned slightly down grade from the position of the tooth. Thus, when the balls 120 engage in the tooth openings 34, a tooth is moved up the platform by a slight distance. It will be apparent that the stop 112 should be positioned down grade by a distance equivalent to the maximum tolerance limits of the tooth so that in no instance will clamping a tooth tend to move it downwardly along the track and also that the distance downgrade must be less than one half the diameter of the balls 120.

The clamping rocker is moved into and out of clamping position by means of a double acting air motor 124 connected to the clamping rocker 114 by means of a link 126. The movement of the clamping rocker is synchronized with the movement of the grinding wheel 56, by means to be subsequently described, so that the clamping rocker engages and holds the tooth during the period the grinding wheel is engaged therewith, and is lifted after the grinding wheel is moved to its inoperative position so that the tooth may be ejected and permit a new tooth to be fed onto the platform for sharpening thereat.

To eject a sharpened tooth from the platform 110, there is provided a lift pin 130 actuated by suitable means such as an air motor 132 (Fig. 12) to move upwardly through an opening 134 in the platform 110 to lift a tooth as shown in Fig. 14 so that it clears the stop 112, whereupon it will either slide or be pushed by the succeeding tooth over the stop to fall clear of the platform and onto a tray 138 (Fig. 3) or other suitable means for leading it clear of the machine.

Whereas the platform 110 is mounted in fixed position on the table, the grinding wheel 56 is mounted on the table 60 so that its position relative to the platform 110 may be adjusted as the grinding wheel is re-dressed or a new one substituted, and this arrangement will now be described with particular reference to Figs. 3 to 6, inclusive. Fixedly secured to the surface of the table 60 by suitable means is a main base plate 146 to which is secured a feed screw nut 148, as by cap screws 150. The main base plate 146 supports a slide plate 152 having an elongated aperture 154 through which the feed screw nut 148 extends so that the plate 152 can be moved relative to the nut. The slide plate 152 is guided in a straight path by means of slide rails 156 secured to the base plate 146 and extending along the opposite sides of the slide plate 152. The slide plate 152 forms the base of a sub-frame, including a pair of laterally spaced apart, C-shaped side plates 158, 160 which are additionally braced by means of a top or wheel arm support plate 162, by a back plate 164 and a front or screw thrust plate 166. Engaged in the feed screw nut 148 and extending through the thrust plate 166, is a feed screw 168 which is held against axial movement relative to the thrust plate by means of a collar 170 fixed to the screw and engaging the rear side of the thrust plate and an indicating dial 172 fixed to the feed screw and engaging the front side of the thrust plate. A handle 174 is provided for rotating the screw 168. Since the screw nut 148 is fixed to the table 60, rotation of the screw 168 will cause the sub-frame and the parts carried thereby to move relative to the table in a direction according to the direction of rotation of the screw. Preferably the dial 172 is provided with indicia to indicate the relative amount of movement of the sub-frame, the reason for which will be made more apparent hereinafter.

The grinding wheel 56 is supported on the sub-frame for movement between an operative position in engagement with the tooth at the grinding station and an inoperative position remote from the grinding station. In the illustrated embodiment of the invention, the grinding wheel is mounted so as to swing between these two positions. Mounted on the wheel arm support plate 162 is a pair of brackets 176 (Fig. 6) which support a wheel arm shaft 178 which extends laterally outwardly of each of the side plates 158, 160. The shaft 178 supports at its opposite ends a pair of arms including a left arm 180 and a right arm 182 formed as solid, square structures (see Fig. 20) for maximum strength and rigidity. While the arms differ from one another in certain structural features, each is formed with a head which engages the shaft 178 substantially as shown in the cross sectional view of left arm 180 in Fig. 16. As shown in that view, the head portion of each of the arms is provided with an opening 186 for receiving the corresponding end of the shaft 178, the opening being lined with a bushing 188. The side of the opening 186 opposite the end of the shaft is closed by a cover plate 190 through which is threaded an adjustment screw 192 which engages the corresponding end of the shaft so that the position of the arms 180, 182 may be adjusted laterally of the machine. A set-screw 194 may be provided to lock the adjustment screw 192 in position.

Secured to and extending between the lower ends of the arms 180, 182 is a bearing plate 196 (see Fig. 6) which serves to fixedly space the arms relative to one another. Each of the arms 180, 182 also has fixed to the lower end thereof a bearing 198 which supports a wheel shaft 200 to one end of which the grinding wheel 56 is secured by suitable means such as collars 202 and a nut 204. To the opposite end of the shaft 200 is fixed a pulley 206 upon which is trained a belt 208 driven by a motor 210 supported on the tops of the arms 180, 182 so as to pivot therewith. As best shown in Figs. 5 and 6, the motor 210 is secured to a motor base 212 which is adjustably supported from a motor base plate 214 by means of a nut and bolt arrangement indicated generally at 216, or other suitable means, the base plate being secured directly to the tops of the arms 180, 182 by bolts 217 or other suitable means. As will be apparent, the tension on the belt 208 may be adjusted by varying the position of the motor base 212 relative to the base plate 214. Also, it will be apparent the motor 210 will swing as the arms 180, 182 are swung so that the tension on the belt 208, and hence the drive to the grinding wheel 56, will remain constant.

Means are provided for effecting movement of the grinding wheel into and out of operative position at the grinding station in synchronization with the means for feeding saw chain teeth thereto and for ejecting the teeth from the station. In the illustrated embodiment such means include a motor 222 supported on a plate 224 which is in turn supported from the side plates 158, 160 by brackets 226. The motor 222 is connected to a reduction speed gear box 228 (see Fig. 3), the output shaft of which is drivingly connected by a chain and sprocket indicated generally at 230 to a cam shaft 232 supported from the back plate 164 by bearings 234. To one end of the shaft 232 is secured a crank 236 connected by a linkage 238 to the end of the pusher rod 86 so that the pusher rod is reciprocated with each revolution of the cam shaft 232. Secured to the shaft 232 between the bearings 234 is a wheel feed cam 240 which, as shown in Fig. 5, is generally circular with the exception of a flat indicated at 242. The cam 240 is adapted to actuate a pusher arm 246 having a cam engaging roller 248 mounted on the end thereof and engaging the cam through an opening 243 in the plate 164. The pusher arm extends horizontally along the inner side of the right hand side plate 160 from which it is supported by a pusher guide 250 which, as shown in Fig. 17, is pivotally mounted on the side plate 160 by means of a spindle 252 secured to the guide and extending through a cooperative opening in the side plate 160. The pusher arm 246 extends over the bearing plate 196 and is detachably secured to the bearing plate 196 by means of a clevis 254 mounted on the bearing plate and having a pin 256 which engages within a slot 258 formed in the pusher arm (see Fig. 18). The grinding wheel and its arm assembly are urged to the inoperative position of the grinding wheel by means of a coil spring 260 secured at one end to the wheel arm bearing plate 196 and at its other end to the side plate 160, as shown in Fig. 5. Thus, the pusher arm 246 is urged into contact with the cam 240 to follow such cam as it revolves, so that when the cam flat 242 is in engagement with the pusher arm 246, the grinding wheel 56 will be in its inoperative position. However, when the cam revolves to bring the circular portion of its periphery into contact with the pusher arm, the grinding wheel will be moved to its operative position. The platform 110 is mounted in fixed position on the table 60 in such relation to the grinding wheel 56 that in its operative position the grinding wheel engages a tooth 30 as shown in Figs. 1 and 2.

The pusher arm 246 is provided with a handle 264 to permit an operator to pivot the handle about the axle 252 of the pusher guide 250 so as to disengage the pusher arm from the clevis pin 256 and free the grinding wheel assembly. This is desirable in instances where the machine is stopped with the grinding wheel 56 in engagement with a tooth so that before starting the machine again the grinding wheel can be moved away from the tooth.

Referring again to Fig. 3, also mounted on the shaft 232 are cams 270 and 272 for operating the air motors 124, 132, respectively. The cam 270 is engaged by a pusher 274 which actuates an air valve in an air line (not shown) to the air motor 124 so as to control the operation of the air motor in its desired relation to the movement of the grinding wheel 56 between operative and inoperative position. The cam 272 is engaged by the pusher 278 of an air valve which similarly controls the motor 132 in its desired relation to the movement of the grinding wheel 56. The details of the air valves and the connection thereto to the air motors are not shown since suitable arrangements are well known to those skilled in the art.

Means are provided on the machine for dressing the grinding wheel 56 to its desired arcuate contour and reference is made to Figs. 19 to 29, inclusive, which particularly show such means. The dressing means include a diamond 300 mounted for rotation about the periphery of the wheel (see Figs. 21 and 22) on a dresser arm 302 supported on the machine so that it may be adjusted both vertically and laterally of the grinding wheel so as to position the diamond accordingly. The dresser arm 302 is provided with a spindle 304 projecting toward the front of the machine to which is secured a handle 306 by means of which the dresser arm can be rotated to move the diamond across the periphery of the wheel. A spindle 308 also extends from the rear of the dresser arm. The front spindle is journaled in a support block 310 and the rear spindle 308 is journaled in a support block 312. The support blocks are adjustably mounted on a support member 316 so that the dresser arm may be moved laterally to adjust the position of the diamond 300 with respect to the grinding wheel 56. The support member is in turn mounted on the arm 182 in such manner that it can be raised or lowered relative to the wheel to correspondingly raise or lower the diamond, the arrangement for so mounting the support member being described hereinafter. Each of the support blocks 310, 312 is provided with a rectangular projection 322 which fits within a rectangular slot 324 formed in the adjacent end of the support member 316. The support blocks 310, 312 are mounted in similar manner and only the mounting of the front support block 310 will be described in detail. Referring now to Figs. 23, 24 and 25, to move the support block 310 towards the support member 316, an adjustment screw 326 is provided which extends through an unthreaded opening in the support member and into a cooperatively tapped opening 328 in the support block. To move the support block 310 away from the support member, a second adjustment screw 329 is provided, this latter screw extending through a tapped opening in the support member and abutting against the support block. Mounted by screws 330 on the end of the support member 316 and abutting the support block 310 is a retainer plate 332, formed with a slot 334 through which extends a screw 336 which engages in a tapped opening 338 formed in the support block. After the support block is moved to its desired lateral position by adjustment of the screws 326, 329, the screw 336 can be tightened down to rigidly clamp the support block against the retainer plate 332 in its desired position.

To limit the rotation of the dresser arm 302, the rear spindle 308 thereof is formed with an opening 340 into which a stop pin 342 is driven, as shown in Fig. 28. The support block 312 is cut away, as shown in Figs. 26 and 27, to form a semi-circular channel or recess 344. When the wheel 56 is not being dressed, the dresser arm is rotated counterclockwise as it appears from the front of the machine, or to the position shown in dotted lines in Fig. 21, and in which the stop pin 342 is received within the recess 344 at the top of the support block 312. In dressing a wheel, the dresser arm is rotated 180 degrees clockwise to the position shown in Fig. 22 to swing the diamond across the top of the grinding wheel. At this point, the stop pin 342 engages in the recess 344 at the bottom of the support block 312 as indicated in dotted lines in Fig. 26 to prevent further movement of the dresser arm and possible injury to the grinding wheel 56.

Vertical adjustment of the support member 316 is obtained by means of a vertical screw 348 threadedly engaging the support member. The support member is guided in its vertical movement by a slide box 350 which surrounds the support arm 182, as shown in Fig. 20, the support member being secured to the slide box by suitable means such as screws 352. The adjustment screw 348 is supported on the arm 182 by means of a collar 354 fixedly secured to the screw and engaging a bracket 356 which extends outwardly of the arm 182 and surrounds the screw beneath the collar. To effect rotation of the adjustment screw 348 and lowering of the support member 316 in increments of predetermined amount, a ratchet clutch is provided including a bottom portion 358 fixed to the screw and a top, manipulative part 360 having a handle 362 secured thereto. The handle 362 extends through an opening 364 formed in a gauge piece 366 secured to and extending from the arm 182. Details of the ratchet are not shown since suitable constructions will be well known to those in the art, but the arrangement is such that the limited movement of the handle 362 within the opening 364 will cause the screw to rotate by an amount to lower the support member 316 by a predetermined distance such as 0.001 inch. Thus, if inspection of teeth being ground by the wheel 56 indicates that the wheel needs to be re-dressed, the operator simply moves the handle 362 first to the left and thence to the right, as viewed in Fig. 6, which will lower the support member by 0.001 inch. The operator then turns the handle 306 to move the diamond 300 across the periphery of the grinding wheel 56 several times. If, after this is done, it appears that the grinding wheel is still not dressed properly, the operator may manipulate the ratchet handle 362 once again to lower the diamond another 0.001 inch and again dress the wheel. This is continued until the wheel is dressed to the desired contour.

When the wheel has been properly dressed and is in condition for sharpening the saw chain teeth 30, the subframe is moved toward the grinding station by means of the feed screw 168. The provision of indicia on the dial 172 to indicate the distance of movement of the sub-frame assembly facilitates positioning the sub-frame forwardly by the amount of decrease in the radius of the re-dressed grinding wheel, so that after re-positioning of the sub-frame, the grinding wheel 56 is in accurate position for continuing sharpening of the teeth 30 with little loss of time.

The operation of the machine may now be summarized. Teeth 30 to be sharpened are placed in the pan 50 which is driven counterclockwise causing some of the teeth to catch on the bar 72 on which they slide into the track 52 and on down towards the grinding station 54. Periodically, the pusher rod 86 is actuated to engage the tooth positioned under the shoe 94 and push it and the down track teeth toward the grinding station 54. Operating in timed relation to the pusher rod 86 is the clamping rocker 114 which is actuated to clamp each tooth as it moves into position beneath the clamping head 118. When the tooth is clamped the grinding wheel 56 is swung forwardly to engage the tooth for a predetermined period of time and grind a sharpened edge on the tooth cutter. Finally, the grinding wheel is retracted whereupon the clamping rocker 114 is actuated to lift the clamping head 118 from the tooth. Simultaneously the lift pin 130 is moved upwardly to lift the sharpened tooth over the stop 112 so that the tooth will slide off the grinding station platform 110 to clear it for the next tooth approaching thereto in the track 52.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. In a machine for grinding saw chain cutters formed on teeth having a flat body portion formed with a pair of circular, transverse pivot pin receiving openings, said machine comprising an elongate trackway for containing a supply of saw chain teeth in end-to-end relation thereon, said trackway having a flat upwardly facing surface portion for engaging and supporting said teeth by said body portion thereof, a grinding wheel, means for moving said grinding wheel into predetermined position adjacent an end of said trackway to engage and grind the cutter of a tooth positioned thereat, and a clamping member mounted adjacent said trackway end for clamping a tooth to be sharpened, said clamping member having a pair of hemispherical elements projecting therefrom of a predetermined diameter slightly greater than the diameter of said openings and having their centers spaced apart a predetermined distance equal to the spacing between the axes of said tooth openings, said hemispherical elements being in predetermined position relative to the operative position of said grinding wheel and acting to move the cutter into correct position for engagement by said grinding wheel from an approximately correct position.

2. A machine for grinding saw chain cutters formed on teeth having a flat body portion formed with a pair of circular, transverse pivot pin receiving openings, said machine comprising an elongate, vertically inclined member forming a trackway for containing a supply of saw chain teeth in end to end relation thereon, a grinding wheel, means for moving said grinding wheel into predetermined, operative position adjacent the lower end of said trackway to engage and grind a tooth positioned thereat, and means for positioning a tooth in predetermined relation on said trackway for engagement by said grinding wheel, said positioning means comprising a stop formed on said trackway to engage and hold a cutter tooth to be sharpened at a point slightly down grade from its grinding position, and a clamping member mounted adjacent said trackway for clamping a cutter to be sharpened against said trackway, said clamping member having a pair of hemispherical elements projecting therefrom of a predetermined diameter slightly greater than the diameter of said openings and having their centers spaced apart a predetermined distance equal to the spacing between the axes of said tooth openings, said hemispherical elements being in predetermined position relative to the operative position of said grinding wheel, whereby when said elements are centered in the openings of a saw chain tooth, the cutter is positioned in correct position for engagement by said grinding wheel, and means for moving said clamping member into and out of clamping position.

3. A machine for grinding saw chain cutters formed on teeth having a flat body portion formed with a pair of circular, transverse pivot pin receiving openings, said machine comprising an elongate trackway for containing a supply of saw chain teeth in end-to-end relation thereon, a grinding wheel, means for moving said grinding wheel into a predetermined, operative position adjacent an end of said trackway to engage and grind a tooth positioned thereat, means for urging the teeth on said trackway toward said end, and means for positioning a tooth in predetermined relation on said trackways for engagement by said grinding wheel, such positioning means comprising a stop formed on said trackway to engage and hold a cutter tooth at a point beyond its grinding position on said trackway by a distance less than one-half the diameter of said openings, and a clamping member mounted adjacent said trackway for clamping a cutter to be sharpened against said trackway including a pair of hemispherical elements projecting therefrom of a predetermined diameter slightly greater than the diameter of said openings and having their centers spaced apart a predetermined distance equal to the spacing between the axes of said tooth openings, said hemispherical elements being in predetermined position relative to the operative position of said grinding wheel, whereby when said elements are centered in the openings of a saw chain tooth, the cutter is positioned in correct position for engagement by said grinding wheel, and means for moving said clamping member into and out of clamping position.

4. In a machine for grinding saw chain cutters formed on teeth having a flat body portion, the combination comprising an elongate trackway for containing a supply of saw chain teeth in end-to-end relation thereon, said trackway having a flat, upwardly facing surface portion for engaging and supporting said teeth by said body portions thereof, means for urging teeth on said trackway toward one end thereof, a stop element adjacent said end of said trackway projecting upwardly a slight distance above said surface portion so as to engage the body portion of the endmost tooth on said trackway and retain such tooth on said trackway in grinding position, means to clamp said endmost tooth in said grinding position, means to grind said tooth in said position, said trackway having an opening therethrough beneath the position of such lower tooth, a lift pin mounted for vertical movement in said opening, and means for elevating said lift pin to engage and lift a tooth positioned thereover to an elevation above said stop element whereby said lifted tooth may slide over said stop element.

5. In a machine for grinding saw chain cutters formed on teeth having a flat body portion, the combination comprising an elongate, vertically inclined trackway for containing a supply of saw chain teeth in end-to-end relation thereon, said trackway having a flat, upwardly facing surface portion thereon for engaging and supporting said teeth by said body portions thereof, a stop element on the lower end of said trackway projecting upwardly a slight distance above said surface portion as to engage the body portion of the lowermost tooth on said trackway and retain such tooth and teeth thereabove on said trackway in grinding position, means to clamp said endmost tooth in said grinding position, means to grind said tooth in said position, said trackway having an opening therethrough beneath the position of such lower tooth, a lift pin mounted for vertical movement in said opening, and means for elevating said lift pin to engage and lift a tooth positioned thereover to an elevation above said stop element whereby said lifted tooth may slide over said stop element.

6. Apparatus for grinding the cutter of a saw chain tooth comprising a frame including an upright structure, arm means pivotally mounted at one end thereof upon said upright structure for pivotal movement about a horizontal axis, a grinding wheel journaled in the opposite end of said arm means for rotation about a horizontal axis parallel to said first mentioned axis, a pusher arm, a pusher guide mounted on said upright structure for pivotal movement about a horizontal axis parallel to said first mentioned axis and slidably supporting said pusher arm, cam means engaging one end of said pusher arm to effect reciprocation of the same, a horizontally extending pin on said arm means, said pusher arm having a generally vertically extending slot formed in the lower surface thereof for releasably receiving said pin whereby reciprocation of said pusher arm will effect reciprocation of said arm means, spring means operatively arranged between said arm means and said frame to urge said pusher arm into engagement with said cam means, and holding means for holding a saw chain tooth in a predetermined position for engagement by said grinding wheel in a limit position of said grinding wheel.

7. Apparatus for grinding the cutters of a saw chain tooth comprising a frame including an upright structure, arm means pivotally mounted at one end thereof upon said upright structure for pivotal movement about a horizontal axis, a grinding wheel journaled in the opposite end of said arm means for rotation about a horizontal axis parallel to said first mentioned axis, a pusher arm, a pusher guide mounted on said upright structure for pivotal movement about a horizontal axis parallel to said first mentioned axis and slidably supporting said pusher arm, cam means engaging one end of said pusher arm to effect reciprocation of the same, a cooperative means on said arm means and said pusher arm releasably connecting the same together whereby reciprocation of said pusher arm will effect reciprocation of said arm means, spring means operatively arranged between said arm means and said frame to urge said pusher arm into engagement with said cam means, and holding means for holding a saw chain tooth in a predetermined position for engagement by said grinding wheel in a limit position of said grinding wheel.

8. A machine for grinding the cutting edge of separate saw chain cutter units prior to the assembly thereof into a saw chain, each of said cutter units having a flat, generally rectangular body portion and an offset tooth shank portion formed on one edge of said body portion and a flat tooth toe portion extending from the end of said shank portion substantially at right angles with respect to said body portion and across said one edge thereof, said machine having a hopper for receiving a supply of said cutter units, a cutter unit pick-up means extending into said hopper for picking up cutter units therefrom in a predetermined aligned position, means for conveying cutter units in said aligned position from said pick-up means to a grinding station, means for firmly holding momentarily each of said cutter units in succession at said station, and grinding means movably mounted at said grinding station for engaging each of said successive cutter units for grinding a cutting edge on each of said units.

9. A machine for grinding the cutting edge of separate saw chain cutter units prior to the assembly thereof into a saw chain, each of said cutter units having a flat body portion and an offset tooth shank portion formed on one edge of said body portion and a flat tooth toe portion extending tangentially from the end of said shank portion substantially at right angles with respect to said body portion and across said one edge thereof, said machine having a hopper for receiving a supply of said cutter units, a cutter unit pick-up means consisting of a bar having a substantially right angle corner extending into said hopper for picking up cutter units therefrom in a predetermined aligned position, an elongated track means for conveying cutter units in said aligned relationship from said pick-up means to a grinding station, means for firmly holding momentarily each of said cutter units in succession at said station, a grinding means movably mounted at said grinding station for engaging said tooth portions of each of said successive cutter units for grinding a cutting edge on said units, and means for positively ejecting each cutter unit from said station following each grinding operation.

10. In a machine for grinding the cutting edge of separate saw chain cutter units prior to the assembly thereof into a saw chain, each cutter unit including a flat body portion, an offset tooth shank portion formed on one edge of said body portion and a flat tooth toe portion on the end of said shank portion and extending at substantially right angles with respect to said body portion, said toe portion overhanging one side of said body portion, said machine having a hopper for receiving a supply of said cutter units, a cutter unit pick-up means extending into said hopper for engaging said cutter units therein beneath said one side and overhanging toe portions thereof, a track means for conveying said cutter teeth from said pick-up means to a grinding station, said track means including a flat upper surface for supportingly engaging said one side of said cutter units, means for clamping individual successive cutter units against said upper surface at said grinding station, a circular grinding wheel movably mounted on said machine for movement from an inoperative position into an operative position in engagement with said tooth portions while each cutter unit is held at said grinding station.

11. A machine for grinding the cutting edge of separate saw chain cutter units prior to the assembly thereof into a saw chain, each of said cutter units having a flat body portion and an offset tooth shank portion formed on one edge of said body portion and a flat tooth toe portion extending tangentially from the end of said shank portion substantially at right angles with respect to said body portion and extending across said one edge, the forward edge of the toe portion slanting rearwardly of said unit at an acute angle, said machine including a hopper for receiving a supply of said cutter units, elongated track means for conveying cutter units from said hopper to a grinding station, a cutter unit pick-up means extending into said hopper for picking up cutter units therefrom and depositing them on said track means in a predetermined aligned relation with said tooth toe portions extending beyond one edge of said track means, means for firmly holding each of said cutter units in succession momentarily at said station, and a rotatable grinder movably mounted at said grinding station for movement between an operative and an inoperative position, the axis of said grinder being tilted relative to the plane of the flat body portion of said cutter units held at said station by an angle corresponding to said acute angle, whereby the forward edge of said toe portion is sharpened throughout its length by said grinder.

12. A machine for grinding the cutting edges of separate saw chain cutter units prior to the assembly thereof into a saw chain, each of said cutter units including a flat body portion and an offset tooth shank portion formed on one edge of said body portion and a substantially flat tooth toe portion extending from the end of said shank portion substantially at right angles with respect to the said body portion and across said one edge thereof, the forward edge of said toe portion slanting rearwardly of said unit at a predetermined acute angle, said machine including a hopper for receiving a supply of said cutter units, a cutter unit pick-up means extending into said hopper for picking up cutter units therefrom in a same predetermined position, means for conveying cutter units from said pick-up means to a grinding station, means for firmly clamping each of said units by the said body portion thereof in succession at said station, a grinding wheel rotatable in a given plane and movable toward and away from said station, said clamping means being inclined at said predetermined acute angle with respect to said plane so that as said grinding wheel is moved into engagement with a cutter unit clamped at said station a cutting edge is formed on the tooth toe portion thereof slanting rearwardly at an acute angle with respect to the plane of the flat body portion of such unit.

13. A machine for grinding the cutting edge of separate saw chain cutter units prior to the assembly thereof into a saw chain, each of said cutter units having a flat body portion and an offset tooth shank portion formed on one edge of said body portion and a substantially flat tooth toe portion extending from the end of said shank portion substantially at right angles with respect to the said body portion and across said one edge thereof, the forward edge of said toe portion slanting rearwardly at a predetermined acute angle, said machine comprising a hopper for receiving a supply of said cutter units, a cutter unit pick-up means extending into said hopper for picking up cutter units therefrom in a predetermined position, an elongated track means for conveying cutter units from said pick-up means to a grinding station, means for clamping the body portion of each of said units in succession against a cooperating fixed flat clamp surface at said station, a grinding wheel rotatable in a given plane and movable toward and away from said track means at said station, said clamp surface being inclined at said predetermined acute angle with respect to said plane for positioning each of said cutter units so that as said grinding wheel is moved into engagement with said cutter unit a cutting edge is formed on said tooth toe portion at an acute angle with respect to the plane of said flat body portion.

14. A machine for grinding the cutting edges of separate saw chain cutter units prior to the assembly thereof into a saw chain, each of said cutter units having a flat body portion and an offset tooth shank portion formed on one edge of said body portion and a substantially flat tooth toe portion extending from the end of said shank portion substantially at right angles with respect to the said body portion and across said one edge thereof, the forward edge of said toe portion slanting rearwardly of said unit at a predetermined acute angle, said machine comprising a hopper for receiving a supply of said cutter units, an elongated track means for conveying cutter units from said hopper to a grinding station, a cutter unit pick-up means extending into said hopper for picking up cutter units therefrom and depositing the cutter units in said track means in a predetermined position, means for clamping the body portion of each of said units in succession and in a predetermined position against a fixed flat clamp surface at said grinding station, a grinding wheel rotatable in a given plane and movable toward and away from said station, said clamp surface being inclined at said predetermined acute angle with respect to said plane so that as said grinding wheel is moved into engagement with said cutter unit a cutting edge is formed on said tooth toe portion slanting rearwardly at an acute angle with respect to the plane of said flat body portion by reason of said inclination in said first direction, said units also being inclined at said station with said toe portion thereof at an acute angle relative to said plane so that said cutting edge is beveled by reason of said latter inclination.

References Cited in the file of this patent

UNITED STATES PATENTS

| | | |
|---|---|---|
| 313,949 | Otis | Mar. 17, 1885 |
| 531,806 | Paske | Jan. 1, 1895 |
| 1,763,065 | Pribnow | June 10, 1930 |
| 1,997,551 | Romaine | Apr. 9, 1935 |
| 2,117,917 | Silven | May 17, 1938 |
| 2,262,049 | Robinson | Nov. 11, 1941 |
| 2,662,427 | Smal | Dec. 15, 1953 |

FOREIGN PATENTS

| | | |
|---|---|---|
| 592,175 | Germany | Feb. 2, 1934 |
| 655,574 | France | Dec. 18, 1928 |
| 673,304 | Germany | Mar. 20, 1939 |